Figure 1:
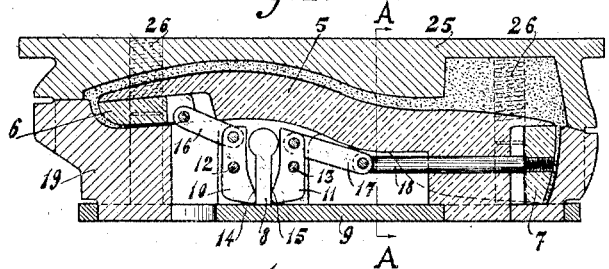
Figure 2:
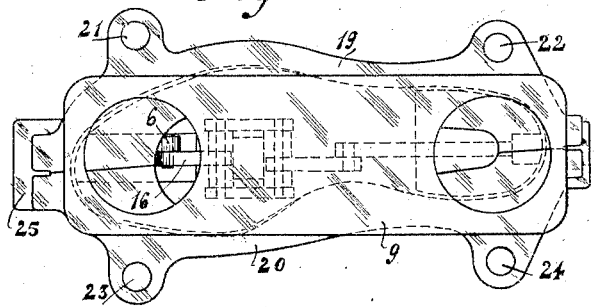

D. F. WILHELMI.
VULCANIZING MOLD FOR BOOTS AND SHOES.
APPLICATION FILED FEB. 14, 1920.

1,349,796.

Patented Aug. 17, 1920.

Inventor:
Dirk Frans Wilhelmi
By Lawrence Langner
Attorney

UNITED STATES PATENT OFFICE.

DIRK FRANS WILHELMI, OF DOORWERTH, NETHERLANDS.

VULCANIZING-MOLD FOR BOOTS AND SHOES.

1,349,796.   Specification of Letters Patent.   Patented Aug. 17, 1920.

Application filed February 14, 1920. Serial No. 358,614.

*To all whom it may concern:*

Be it known that I, DIRK FRANS WILHELMI, manufacturer, a subject of the Queen of the Netherlands, residing at "Huis ter Aa", Doorwerth, the Netherlands, have invented certain new and useful Improvements in Vulcanizing-Molds for Boots and Shoes, of which the following is a specification.

This invention relates to a vulcanizing mold for the manufacturing of boots or shoes.

Up to the present boots and shoes, such as overshoes and bathing shoes, are not vulcanized under high pressure. One is satisfied with free vulcanization or at the utmost a flexible last is used, which by means of a liquid, sand or compressed air can be expanded in order that the soft material will fill up the mold.

The pressure to be attained by the means aforementioned however is not sufficient for obtaining a rubber product, that does compete with leather or surpasses the latter. A strong material, having a large resistance against wearing, needs a high pressure during vulcanization, in order to completely fill up the mold.

Up to the present it was not possible to obtain underwork for boots and shoes, provided with a toepiece, counterfort and edges along the sole by vulcanization under high pressure. Apparently the difficulties that could not be overcome were the bunching and folding of the material of the half product when being closed into the vulcanizing-mold; viz: the difficulty really existed in not being able to construct a good vulcanizing-mold.

Such a mold should prevent the bunching and folding of the duck and other parts of the hand-made under-work, should be able to resist the high pressure required for good vulcanizing and finally should exercise a uniform pressure on the rubber fill.

The mold in accordance with the invention fills, according to the experiments made, all the requirements, which for a product, as difficult to fabricate as the one in question, should be expected.

According to the invention the mold consists of: a last, which, at the toe and at the heel, has parts of solid material, that can be shoved in and out and are shaped more or less like the lasts, which are used for the elongation and the keeping in shape of boots and shoes; of two or more parts, which form the outer mold for the circumference of the boots or shoes and of a sole-mold, fitting unto the circumference-molds.

It is preferred to use a closing member, to keep the circumference - molds together and to react against the great pressure, which, by means of the sole-mold, is exercised on the rubber-mixture and which, on the other hand is absorbed by this mixture and by the last. However this closing member is not essential. It can be replaced by some other suitable clamping device as used in the manufacturing of rubber goods. However, except as a closing member, it can be very well used in connection with the operation of the actuating mechanism for those parts of the last that can be shoved in and out, as hereinafter will be explained in an example.

The mold in accordance with the invention can be used as follows:

The under part of the shoe, or boot, ready for vulcanizing is placed around the last, the movable parts thereof being pulled in. This position of the movable parts makes the circumference considerably shorter, and therefore the duck can be put in place without tension. Then the outside molds are put in place, preferably by means of mechanical expansion tongues, as is customary for the placing of large mold sections in the rubber industry.

This placing of the outside molds already causes a pressure on the rubber mixture, which in its turn causes bunching and folding of the material near the nose and the heel. However, with the third step, the extension of the movable parts of the last, these folds are extenuated at once, which is therefore quite easy, that the increase in circumference causes tension in the duck. The fourth step of the process is the bringing under high pressure of the sole, which pressure is maintained while the vulcanizing takes place. While this pressure lasts the last and the circumference molds must be kept absolutely immovable in their places, which preferably is obtained by arranging the sole-mold with guides which work in conjunction with the circumference molds.

In the drawing accompanying and forming a part of this specification, Figure 1 shows a longitudinal section of the last, the outside mold and the closing-member. Fig.

Figure 3:
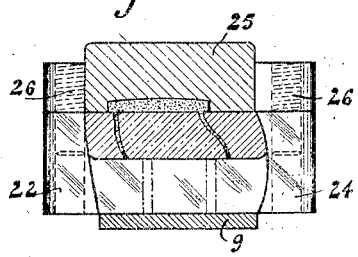
Figure 4:
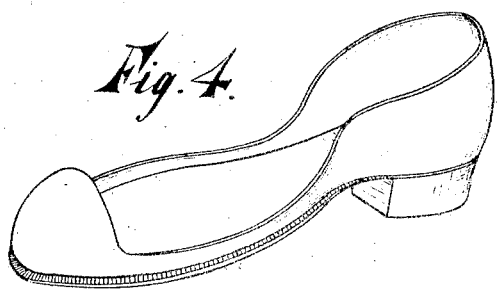

2 is a bottom view of the complete mold. Fig. 3 is a cross-section on line A—A in Fig. 1. Fig. 4 is a perspective of the under part for a boot or shoe, vulcanized in the mold according to the invention.

Last 5 has at its point a block 6, which is shown in its pulled in position, and at the heel a similar block 7. These two parts can be moved simultaneously by nock 8, which is connected to the closing member 9 and actuates levers 10 and 11. The latter can turn around pins 12, 13, as soon as nock 8 is moved away from the last; it touches the sloping sides 14 and 15 of levers 10, 11, with the result, that by means of connecting rods, 16, 17 and the handle 18 the blocks 6 and 7 are moved inward. When the inward movement is finished, the sloping sides 14 and 15 are about parallel. When nock 8 is moved back it actuates in similar manner the other arms of levers 10 and 11 and blocks 6 and 7 are pushed out, to the position shown in the drawing.

As soon as the, by hand assembled, bottom piece, consisting of duck, rubber-mixture and possibly filling material, which already in general has the shape shown in Fig. 4, is placed on the last, the circumference molds, 19, 20 are closed, preferably by means of a mechanical tongue. As soon as these form a close fit, the closing-member can be moved upward and placed around nocks 21, 22, 23, 24 of the circumference molds 19 and 20, which simultaneously moves blocks 6 and 7 outward.

Then the sole-mold 25 is placed with bolts 26 in the corresponding openings of the circumference molds, which prevents the moving of the upper parts of these pieces.

Now a great pressure can be exercised on the sole-mold, which pressure is divided uniformly over all of the underwork of the shoe to be made, notwithstanding the mixture used is not very plastic, which makes it well fit for hard-wear shoes or boots.

The strong support which the last according to the drawing, receives from the closing-member, prevents the pressure from reacting all on one side of the shoe. When the mold is taken apart after the vulcanizing process is finished, the fact that parts 6 and 7 are pulled in, makes it easy or possible to remove the vulcanized shoe or boot, as the circumference of the last has been shortened.

Neither on the inside, nor on the outside of the shoe or boot, bothersome heavy ribs can be formed as the counterparts of seams between parts of the mold.

In case the seam over the center of the toe is not wanted, the outside mold can be made in three pieces. One thereof closes over the nose of the shoe in such a manner, that a seam is formed in the same place, where, for leather shoes, the nose-piece changes into the upper-leather.

Such a cross seam can furthermore be masked completely by means of ornamental or relief-work.

It is plain that the actuating-mechanism of the mold is of no importance for the invention. It is, however, of great importance for the success of the vulcanizing process, that all parts of the mold are made of a solid material, in opposition to the systems described in the preamble of the specification which describes molds in which a last of supple material filled with sand or the like is used.

What I claim and desire to secure by Letters Patent is:

1. Vulcanizing-mold for the manufacturing of boots or shoes, comprising a last, having at its point and heel, parts which can be moved in and out, circumference mold-sections, a sole-mold section which can be placed under pressure and means for moving the parts at point and heel of the last in and out.

2. Vulcanizing-mold for the manufacturing of boots or shoes, comprising a last having at its toe and heel solid parts which can be moved in and out, circumference-mold sections, a sole mold section, which can be pressed down, a closing plate, which ties the circumference mold sections together and means for moving the solid parts in and out, said means being actuated by the closing plate.

3. Vulcanizing-mold for the manufacturing of boots or shoes, comprising a last, having at its point and heel solid parts which can be moved in and out, circumference-mold sections, a sole-mold section which can be placed under pressure and ties the circumference-mold sections together and means for moving the solid parts in and out.

4. Vulcanizing-mold for the manufacturing of boots or shoes, comprising a last having at its toe and heel solid parts which can be moved in and out, circumference-mold sections, a sole-mold section, which can be pressed down, and ties the circumference mold sections together, a closing plate, which ties the circumference-mold sections together and means for moving the solid parts in and out, said means being actuated by the closing plate.

In testimony whereof I affix my signature.

DIRK FRANS WILHELMI.